United States Patent Office 3,639,545
Patented Feb. 1, 1972

3,639,545
PROCESS FOR MAKING CYCLIC ALKYLENE
PHOSPHATE, ALKYLENE ESTERS
Robert D. Wilcox, Palo Alto, Calif., assignor to The
Dow Chemical Company, Midland, Mich.
No Drawing. Filed Mar. 26, 1968, Ser. No. 715,993
Int. Cl. C07f 9/08
U.S. Cl. 260—971
6 Claims

ABSTRACT OF THE DISCLOSURE

Cyclic alkylene phosphate, alkylene esters are prepared by reacting a bis-alkylene pyrophosphate with an equimolar proportion of a vicinal alkylene oxide, $R^2O$. This reaction can be represented as follows:

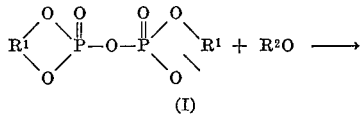

(I)

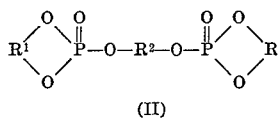

(II)

where $R^1$ and $R^2$ are vicinal alkylene groups. The compound of Formula II can be reacted with various active hydrogen compounds such, for example, as alcohols, glycols, water or the like, to open its rings and form alkylene phosphate esters useful as fire retardants in polyurethanes.

CROSS REFERENCE TO RELATED APPLICATION

A method for preparing the bis-alkylene pyrophosphates employed as a starting material herein forms the subject of co-pending application entitled "Process for Making Bis-Alkylene Pyrophosphates," Ser. No. 703,542, filed Feb. 7, 1968, in the names of Robert S. Olson, Guy H. Harris and Robert D. Wilcox.

BACKGROUND OF THE INVENTION

The cyclic organo-phosphate compounds hereof can be described using different systems of nomenclature. Thus, following novel compound is generically referred to herein as a cyclic alkylene phosphate, alkylene ester. It is specifically termed cyclic ethylene phosphate, methylethylene ester and has the formula:

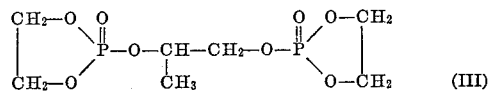

(III)

In another system this compound would be described as phosphoric acid: cyclic ester with ethylene glycol, methylethylene ester, or as phosphoric acid: ethylene glycol cyclic ester, 1,2-propanediol diester.

The phosphorus-containing starting compound used in the present method to prepare the compound of Formula III is generically referred to herein as a bis-alkylene pyrophosphate. It is specifically designated as the bis cyclic ethylene ester of pyrophosphoric acid and has the formula:

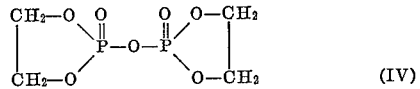

(IV)

By another system of nomenclature, this compound would be known as 2,2′-dioxo-pyro-1,3,2-dioxaphospholane.

A derivative compound prepared from the compound of Formula III by reaction with ethylene glycol has the formula:

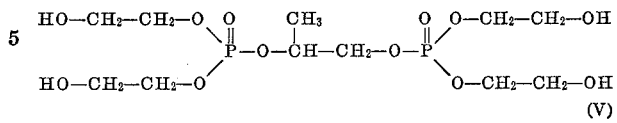

(V)

This compound is generically referred to herein as a hydroxyalkyl phosphate, alkylene ester and is specifically designated as di(2 - hydroxyethyl) phosphate, methylethylene ester. It may be otherwise referred to as phosphoric acid: bis(2-hydroxyethyl) ester, ester with 1,2-propylene glycol. Again, it can be described as phosphoric acid; bis(2-hydroxyethyl) ester, methylethylene ester.

U.S. Pat. No. 3,159,664 teaches the preparation of certain cyclic alkylene phosphates. However, it discloses no compound wherein the cyclic phosphate groups are linked to one another through an alkylene radical as is the case in the present invention.

SUMMARY OF THE INVENTION

This invention relates to a new process for preparing novel cyclic alkylene phosphate, alkylene esters and various acyclic derivatives thereof. More particularly, the process is one wherein said cyclic esters are prepared by reacting a bis-alkylene pyrophosphate with an equimolar amount of a vicinal alkylene oxide. This reaction, whereby the alkylene oxide becomes inserted into the pyrophosphate, can be represented as follows:

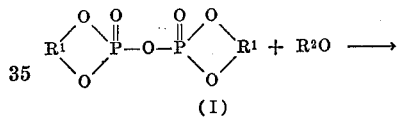

(I)

(II)

wherein each $R^1$ and $R^2$ individually represents a vicinal alkylene residue, i.e., a divalent ethylene or substituted ethylene residue of a vicinal alkylene oxide. It is an important feature of the present invention that the practice of the method thereof makes it possible to insert into the molecule an $R^2$ group which may be the same as or different from the $R^1$ groups. The $R^1$s, in turn, may be the same or different from one another.

The foregoing insertion reaction takes place as the reagents are contacted with one another in the presence of a liquid reaction medium which does not interefere with the reaction at the reaction temperatures employed. Suitable unreactive or inert liquids of this character include various hydrocarbons, halohydrocarbons and nitriles, such, for example, as petroleum ether, cyclohexane, benzene, toluene, methylene chloride, chloroform, trichloroethylene, carbon tetrachloride, chlorobenzene, acetonitrile and the like. Upon occasion, the alkylene oxide reactant may serve as the liquid reaction medium. The amount of inert liquid is not critical, and good results can be had by using from about ½ to 5 or more liters per mole of the pyrophosphate reactant.

The alyklene oxide reactant represented by $R^2O$ can be employed in the substantially equimolar amounts in which it is taken up by the pyrophosphate reactant, or it can be employed in excess. For example, the use of excess alkylene oxide is preferred when it is desired to effect full conversion of the pyrophosphate at somewhat reduced temperatures and/or when dealing with the more refractory (i.e., sterically hindered) alkylene oxides. The amount of any such excess is not critical and can run, for example, from about 5 to 100 molar percent or more. It should further be noted that when the amount of alkylene oxide becomes significantly larger than the stoichiometrically required amount, the reagent, if of appropriate boiling point, may supply part or all of the required liquid reaction medium.

Either reactant may be added to the other if suitable precautions are taken to avoid oxide polymerization which may occur at higher temperatures. Preferably the alkylene oxide is slowly added to a solution of the pyrophosphate, especially when the addition of the oxide in larger amounts tends to induce an unusually vigorous, exothermic reaction. The latter can result in undesirable polymerization of the alkylene oxide and thus introduce a measure of non-uniformity into the final product.

The reaction is preferably conducted in the presence of a small amount of an acid catalyst such as terephthalic acid, p-toluenesulfonic acid, oxalic acid, acetic acid, trifluoroacetic acid, concentrated sulfuric or phosphoric acid or an acid-former such as ethanol. Good results are normally had when using the catalyst in amounts of from about 0.05 to 1.5 percent in terms of the weight of the entire reaction mixture.

Reaction times and temperatures for this insertion reaction will vary depending on the nature of the respective reactants and the catalyst, if any, which is present. Thus, the reaction will proceed to completion in most cases when the reaction mixture is allowed to stand at room temperatures for several days or when it is refluxed or otherwise heated for periods of from about ½ to 10 or more hours at temperatures ranging up to about 125° C. Some systems are so active either per se or by reason of the addition of catalyst that the reaction is essentially complete as soon as the alkylene oxide has been added even when operating at relatively low, controlled temperatures such as 20° to 50° C. In this connection, it proves convenient to subject samples of the reaction mixture to infrared analysis in order to determine whether or not the reaction is complete. The bis-alkylene pyrophosphate starting compound is characterized by P=O absorption in the region of 1320–1325 cm.$^{-1}$ while the cyclic alkylene phosphate, alkylene ester product is characterized by a strong P=O peak in the region of 1288–1300 cm.$^{-1}$. The essential disappearance of the former band indicates that the reaction is complete, while the persistence of a static infrared spectrum, with both peaks remaining, may indicate that additional alkylene oxide should be added and/or that the process should be continued, perhaps at higher temperatures or with added catalyst.

Once the reaction is completed, the cyclic alkylene phosphate, alkylene ester can be separated from the other components of the reaction mixture or it can be left therein for further reaction with added active hydrogen compounds, preferably those containing a hydroxyl group. If the product is to be separated and recovered, the reaction mixture is heated, preferably under vacuum, to distill off the solvent along with any residual alkylene oxide or lower boiling reaction products which may be present. Any solids present, or those which may form on holding the liquid product at temperatures of 0° to 10° C., can be filtered off either before or after the distillation.

The cyclic alkylene phosphate, alkylene esters of Formula II can be characterized as heavy oily liquids which cannot be distilled in ordinary distillation equipment without decomposition. They vary in color from water-white to yellow. amber or brown. On being subjected to infrared analysis, they exhibit strong P=O absorption in the region of 1288 to 1300 cm.$^{-1}$. Among other usages, they find utility as pesticides and as additives which impart fire-resistant qualities to polyurethane foams. Another important usage is that of an intermediate from which a wide variety of useful acyclic alkylene phosphates can be prepared.

Substantially any vicinal alkylene oxide can be used in the process of this invention provided it is free of substituents which are detrimentally reactive with bis-alkylene pyrophosphates or the solvent medium at the reaction temperatures employed. Thus, the term "alkylene oxide," as employed herein, is intended to include branched or straight chain alkylene oxides wherein the vicinal carbon atoms attached to the oxygen atom occupy either the 1,2- or some intermediate position, as well as vicinal cycloalkylene oxides. Representative oxides include the various unsubstituted alkylene oxides of 2 to 20 or more carbon atoms such as ethylene oxide, propylene oxide, 1,2- or 2,3-butylene oxide, 1,2- or 2,3-octylene oxide, cyclohexene oxide. 2,4,4-trimethyl-2,3-pentene oxide, 1,2-dodecylene oxide, and the various 1,2- and other vicinal hexadecylene and octadecylene oxides, as well as mixtures of two or more of said compounds. Also included are any corresponding vicinal monoolefinic oxides such as butadiene monoxide, for example, as well as the corresponding halo-substituted alkene oxides such, for example, as epichlorohydrin and epibromohydrin, as well as fluorinated or mixed fluorinated and chlorinated alkylene oxides of the type disclosed, for example, in U.S. Pat. No. 3,366,610. As a practical matter, the preferred reactants are the unsubstituted, saturated, open chain, vicinal alkylene oxides of from 2 to about 20 carbon atoms; these preferred reactant compounds are herein designated, for convenience, as "open chain alkylene oxides" of the indicated carbon atom content.

The bis-alkylene pyrophosphate reactant shown in Formula I can be prepared by the practice of a method such as that described in U.S. Pat. No. 3,159,591 wherein, as the first step, an alkane-1,2-diol is reacted with a phosphoryl halide to form a 2-halo-2-oxo-1,3,2-dioxaphospholane. The reaction takes place as the diol reactant is slowly added to the phosphoryl halide, and at the end of the reaction the hydrogen chloride by-product from the reaction mixture is eliminated. In the second step of the process, the dioxaphospholane intermediate is reacted either with an anhydrous alkali metal salt of an appropriate carboxylic acid or with water and a base. The resulting bis-alkylene pyrophosphates may then be recovered by a practice of vacuum distillation and other purification techniques.

In another method described in co-pending application, Ser. No. 703,542, referred to above, the bis-alkylene pyrophosphate product of Formula I is prepared by reacting $P_2O_5$ with 2 moles of a vicinal alkylene reactant ($R^1O$) under anhydrous conditions. In carrying out this reaction, the alkylene oxide reactant, either as such or in the form of a solution in an inert solvent of the type discussed above, is gradually added to a stirred slurry or suspension of $P_2O_5$ in a similar liquid reaction medium. The reaction is exothermic, and tends to be strongly so in some cases; accordingly, appropriate cooling or heating means are employed to maintain the desired reaction temperatures in a range of from about 0° C. to 100° C. Temperatures of from about 45° to 75° C. are preferably employed when using lower (i.e. $C_2$ to about $C_4$) alkylene oxide reactants, while those of from about 5° to 45° C. are used in the more highly exothermic reactions such as those encountered when using $C_4$ or $C_6$ and higher alkylene oxide reactants. Under optimum temperature conditions, the reaction is essentially complete as soon as all the alkylene oxide has been added or within a relatively short period thereafter. With relatively lower temperatures, it may be desirable to continue stirring the reaction mixture for a somewhat longer period, such as overnight. In those systems wherein the $P_2O_5$ is not employed in excess, the disappearance of the $P_2O_5$ reactant signals the end of the reaction. Once the reaction is complete, or essentially so, the product can be filtered to remove any residual $P_2O_5$ or other solid material present in the liquid reaction mixture. It can also be heated if desired to distill off the solvent and any residue of $R^1O$ employed. The bis-alkylene pyrophosphate produced in this reaction, when subjected to infrared analysis, will be found to be characterized by a strong peak at about 1320–1325 cm.$^{-1}$.

It will be noted that the process of the present invention is one wherein a bis-alkylene pyrophosphate, obtained, for example, by the reaction of 2 moles of alkylene oxide with 1 mole of $P_2O_5$, is further reacted with an additional mole of an alkylene oxide. It has also been found, and forms a feature of the present invention, that by the observance of suitable precautions, and when $R^1$ and $R^2$ are to represent the same radical or mixture of radicals, the cyclic alkylene phosphate, alkylene ester compounds hereof can be prepared in one overall reaction step whereby $P_2O_5$ is reacted with 3 moles of alkylene oxide. In practicing this method, all three moles of the alkylene oxide are added, preferably at a low rate, to a stirred slurry of $P_2O_5$ in an inert liquid reaction medium or solvent. An alcoholic or acid catalyst, of the type and in the amount described above, is preferably added either at the beginning of the reaction, or at a point midway therethrough when approximately 2 moles of the alkylene oxide have been added and it is adjudged that the reaction mixture is rich in the bis-alkylene pyrophosphate product of Formula I. The overall reaction proceeds at temperatures in a range of from about 0° to 125° C. During the initial stage of the reaction, when adding the first 2 moles of the alkylene oxide, reaction temperatures are employed which are appropriate to the formation of the bis-alkylene pyrophosphate compound as discussed above. Somewhat higher temperatures are frequently employed during the terminal stage of the reaction during or after the addition of the third mole and any excess of the alkylene oxide. Thus, temperatures of from about 40° to 60° C. and up to reflux temperatures are employed during the terminal portions of the reaction, notably in the case of the more refractory alkylene oxides such as 2,3-octylene oxide, propylene oxide and the like, so as to drive the reaction to completion. This latter portion of the reaction coincides with that period during which the insertion reaction of the present invention is predominantly taking place. This reaction tends to proceed with greater difficulty in the case of some alkylene oxides, at least, than the preliminary reaction step which is formative of the bis-alkylene pyrophosphates. Some preparations benefit from the use of alkylene oxide in excess of 3 moles per mole of $P_2O_5$, coupled with extended standing at room temperatures or the use of reflux temperatures. Here again, when infrared analysis shows little or no absorption at about 1320–1325 cm.$^{-1}$ and the presence of strong bands at about 1288–1300 cm.$^{-1}$, the reaction is considered complete.

The cyclic alkylene phosphate, alkylene esters prepared by the foregoing one-step method can be recovered as heavy oils by distilling off the solvent and other more volatile components, preferably under vacuum. The esters prepared in this fashion are the same as those obtained by reacting alkylene oxide with a preformed bis-alkylene pyrophosphate, assuming that the $R^2O$ alkylene oxide reactant is the same as the $R^1O$ alkylene oxide which forms a part of the pyrophosphate starting material.

The discovery that hydroxyalkyl phosphate, alkylene esters can be formed from the cyclic alkylene phosphate, alkylene esters also forms a feature of the present invention. This stage of the process can be conducted by reacting the said cyclic ester with at least 2 moles of water, an alcohol, a glycol or other hydroxy compound, $R^3OH$. Preferably the hydroxy compound is employed in substantial excess. In carrying out this reaction, the $R^3OH$ reactant can be combined with the crude solution of cyclic ester as obtained by any of the methods discussed above, or the solution can first be distilled, preferably under vacuum, to remove the solvent and any excess of alkylene oxide or other undesired compounds present before being combined with the $R^3OH$ reactant. An inert solvent may also be added at this point, although use of the same is not necessary inasmuch as the $R^3OH$ reagent can act as its own solvent medium. A catalytic amount of an acidic or basic catalyst is preferably added to the reaction mixture when the $R^3OH$ reactant is one other than water. The reaction will proceed in the absence of such added catalyst, but is greatly speeded up as a material such as phosphoric acid, terephthalic acid, triethylamine, triethylene diamine, pyridine, sodium methylate, dry hydrogen chloride, trifluoroacetic acid or a mono- or dibutyl phosphate is added in amounts ranging from about 0.25 to about 5 percent in terms of the weight of the reaction mixture. The hydrolysis reaction experienced when $R^3OH$ is water can also benefit by the addition of catalyst; however, water normally generates its own acid groups

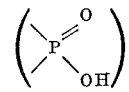

and the hydrolysis reaction proceeds at a rapid rate in the absence of added catalyst, the reaction usually being complete in a matter of 1 to 10 hours, or sooner with heating. Alcoholysis or glycerolysis, on the other hand, may require reaction periods of several days at room temperatures, or reflux periods of about 1 to 10 hours even in the presence of catalyst. The reaction is considered complete when the infrared spectrum shows no further absorption in the region of 1288 to 1300 cm.$^{-1}$. The desired β-hydroxyalkyl diphosphates are characterized by infrared absorption of the trialkyl phosphate type at 1250–1255 cm.$^{-1}$.

The hydroxyalkyl phosphate, alkylene esters produced in the foregoing manner are readily recovered from the reaction mixture by a practice of conventional recovery and purification methods known to the skilled in the art. The usual practice is to heat the reaction mixtures under ambient or reduced pressures at temperatures high enough to distill off the solvent and any unreacted alkylene oxide or other relatively volatile compounds which may be present. The residual hydroxyalkyl phosphate, alkylene ester can be characterized as a heavy oil of a generally colorless to amber, yellow or brown color, which in most cases cannot be distilled in ordinary distillation equipment without decomposition. These compounds are relatively water-soluble and also have low to medium solubility in such solvents as ethanol, acetone and benzene. They have many uses and can be employed, for example, in the manufacture of polyurethanes and epoxy resins, among other uses discussed below.

The $R^3OH$ reactant employed in forming the hydroxyalkyl phosphate, alkylene ester compounds can be water or a suitable hydroxy compound. Suitable hydroxy compounds include methanol, ethanol, n-butanol, isopropyl alcohol, sec.-butyl alcohol, amyl alcohol, hexanol, octyl alcohol, heptyl alcohol, lauryl alcohol, tetradecyl alcohol, allyl alcohol, oleyl alcohol, methallyl alcohol, crotyl alcohol, cetyl acohol, stearyl alcohol, capryl alcohol, polyhydroxy alcohols such as ethylene glycol, polyethylene glycol, trimethylene glycol, ether alcohols of ethylene and alkylene glycols marketed under trade names such as Dowanols and Cellosolves, aralkyl alcohols such as benzyl and β-phenylethyl alcohol, nitroalcohols such as 2-nitropropanol, 2-nitroethanol, pyridinols, chloropyridinols, acetylenic alcohols such as 2-propargyl alcohol, 2-methyl-3-butynol-2,3-methyl-1- pentynol-3,3-butyne-1-ol, 2-butyne-1,4-diol, 2,4-hexadiyne-1,6-diol, 3,6-dimethyl-4-octyne-3,6-diol, and other hydroxy compounds such as dialkylaminoalcohols,
2,4-dichlorophenoxyethanol,
2,4,5-trichlorophenoxyethanol,
2-(2,4-dichlorophenoxy)propanol,
2-(2,4,5-trichlorophenoxy)propanol,
phenol,
pentachlorophenol,
4,6-dinitro-2-sec.-amylphenol, 4,6-dinitro-2-sec.-butylphenol,
4,6-dinitro-2-cresol, and
mono- and polyhalophenols.

The hydroxyalkyl phosphate, alkylene esters, including both those prepared from alcohols or monolglycols, as well as those prepared from alkaneetherpolyols, have many uses. Thus, they can be used as plasticizers for polyurethanes. Because of their hydroxyl groups they are excellent for incorporation into urethane systems where they react with the isocyanate groups in the growing polymer chain and thus become fixed. They can be the sole hydroxyl reactant present or they can be used in admixture with other polyhydroxy compounds such as polyethylene glycol having molecular weights of 400 to 3000, polypropylene glycol having molecular weights of 400 to 3000, ethylene glycol, diethylene glycol, triethylene glycol, propylene glycol and dipropylene glycol. Foamed polyurethanes can be obtained by adding water prior to the addition of the isocyanate. The solid polymethanes obtained have good flame proofing properties and are useful as linings for textiles, insulation in building construction work or upholstery filling material.

As examples of polyisocyanates which can be employed to make the polyurethane there can be used toluene-2,4-diisocyanate; toluene - 2,6 - diisocyanate; 4-methoxy-1,3-phenylene-diisocyanate or 4-chloro-1,3-phenylenediisocyanate. Any of the conventional basic catalysts employed in polyurethane foam technology can be used. These include N-methylmorpholine, N-ethylmorpholine, triethylamine and other trialkylamines, 3-diethylaminopropionamide, heat activated catalysts such as triethylamine citrate, 3 - morpholinopropionamide, 2 - diethylaminoacetamide, etc. In utilizing one shot systems there can be included especially active catalysts such as triethylenediamine, dibutylin dilaurate, dibutyltin diacetate, di-2-ethylhexyltin oxide, dibutyltin monolaurate, octylstannoic acid or dibutyltin diethoxide. Conventional surfactants can be added such as polydimethyl siloxane (50 centistokes grade); triethoxy dimethyl polysiloxane, molecular weight 850, copolymerized with a dimethoxypolyethylene glycol having a molecular weight of 750 and any of the other siloxanes disclosed in Hostettler French Pat. 1,212,252.

The hydroxyalkyl phosphate alkylene ester compounds also are useful for incorporation into epoxy resin systems. Thus, they can react directly in an epoxy system, e.g., with dicyclopentadiene diepoxide, catalyzed preferably by an alkyl aminate. They also can be reacted with maleic anhydride or other polybasic acid or anhydride to give the corresponding acid ester phosphate ester which can react in many epoxy systems without additional catalyst.

They also can be employed to form polyesters, e.g., by reaction mole for mole with maleic anhydride, phthalic anhydride, dimethyl terephthalate, fumaric acid, succinic acid, oxalic acid, itaconic acid, etc. and are additionally useful as textile softening agents and as surfactants.

Additionally they are useful as lubricants, heat transfer fluids, hydraulic fluids and pump fluids. They can be used in place of tricresyl phosphate as gasoline additives, e.g., in an amount of 0.1%. They are also suitable as plasticizers in polyester systems and free radical formed systems, e.g., polymerized methyl methacrylate and as stabilizers for vinyl chloride resins and other halogen containing resins, e.g., when used in an amount of 0.25–10% by weight of the resin. They can be used in existing glycol type lubricants and fluids.

DETAILED DESCRIPTION OF THE INVENTION

The practice of the invention is illustrated by the following examples.

EXAMPLE 1

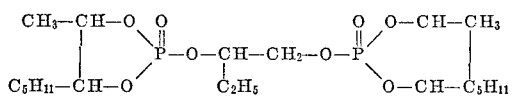

2,3-octylene oxide (32 g., 0.250 mole) was slowly added to a stirred slurry of $P_2O_5$ (17.7 g., 0.125 mole) in 200 ml. toluene in a flask cooled externally with ice water and provided with a stirrer, addition funnel and stoppers as required to provide insulation from the moisture in the atmosphere. During the addition, which took approximately 30 minutes, the temperature of the reaction mixture was maintained at a maximum of 21° C. The solution was then allowed to stand for a short while, following which it was sampled for infrared analysis. The latter disclosed strong absorption at 1320 cm.$^{-1}$ and indicated that the material present was the bis cyclic(1-methyl-2-pentylethylene) ester of pyrophosphoric acid. To this solution was then added (as the $R^2O$ reagent) 9 g. (0.125 mole) of 1,2-butylene oxide which resulted in immediate heating of the reaction mixture. The latter was then maintained at 40°–55° C., with stirring, for 2 hours. Infrared analysis then disclosed the presence of a new band at 1288 cm.$^{-1}$ corresponding to cyclic alkyl phosphates. However, since some pyrophosphate at 1320 cm.$^{-1}$ was still present, the mixture was allowed to stand for 2 days and then tested again. At this time the pyrophosphate band had entirely disappeared. The solvent was then removed under vacuum, leaving a good yield of a light yellow syrupy product having slight solubility in water and good solubility in benzene and acetone. Elemental analysis disclosed the oil to have carbon, hydrogen and phosphorus contents of 50.23, 8.50 and 14.20 percent, respectively, as against theoretical values for cyclic 1-methyl-2-pentylethylene phosphate, ethylethylene ester of 51.06, 8.57 and 13.17 percent.

EXAMPLE 2

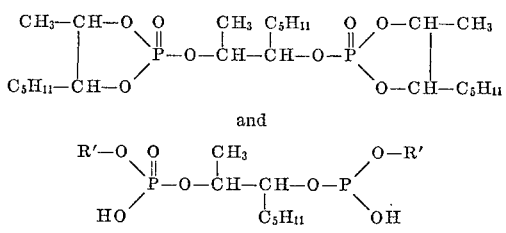

where R'=a mixture of $C_5H_{11}$—CH(OH)CH($CH_3$)— and $C_5H_{11}$—CH(CH(OH)$CH_3$)— groups.

Using equipment similar to that described in Example 1, 2,3-octylene oxide (96 g., 0.75 mole) was added slowly to a stirred suspension of $P_2O_5$ (35.4 g., 0.25 mole) in 500 ml. toluene. During the addition, which took approximately 45 minutes, the temperature of the reaction mixture was maintained at a maximum of 21° C., the reaction being strongly exothermic. After the addition was complete, the clear, water white solution was sampled for infrared analysis, and the latter disclosed a strong peak at 1320 cm.$^{-1}$ characteristic of P=O in bis-alkylene pyrophosphates. The solution was then heated to 105° C. for 6 hours, at which time infrared analysis showed that the 1320 cm.$^{-1}$ band had disappeared and that a new band had appeared at 1292 cm.$^{-1}$ which is characteristic of P=O in the cyclic diphosphates. The compound present in solution was cyclic 1-methyl-2-pentylethylene phosphate, 1-methyl-2-pentylethylene ester. It had the appearance of a yellow oil and was slightly soluble in water and highly soluble in acetone and benzene. Elemental analysis disclosed carbon and hydrogen contents of 52.6 percent and 8.76 percent, as against theoretical values of 54.79 and 9.18 percent. 50 grams of the reaction product was mixed with an excess of water, upon which the mixture separated into two layers. After being stirred for several hours, the mixture was found to be homogeneous, and it was heated under vacuum to distill off the water. The resulting product had the appearance of a heavy yellow syrup. It was moderately soluble in benzene and highly soluble in acetone and water. Elemental analysis disclosed a composition commensurate with the acyclic compound set forth above, the ascertained carbon and hydrogen contents being 48.2 and 9.1 percent, respectively, as compared with theoretical values of 51.30 and 9.31 percent. The neutralization equivalent was 284 as against a theoretical value of 281.3.

EXAMPLE 3

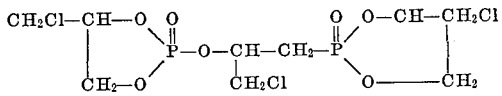

Using the same general apparatus and procedure as described in Example 2, epichlorohydrin (23.1 g., 0.25 mole) was slowly added to a stirred slurry of $P_2O_5$ (17.7 g., 0.125 mole) in chloroform (200 ml.) containing 2 ml. of ethanol catalyst. The reaction was exothermic, and reaction temperatures were held at 43° C. during the addition period. After standing at room temperature for a period of several hours, an additional 11.5 g. (0.125 mole) of epichlorohydrin was added, it being noted that the reaction was still exothermic. As soon as the solution had cooled to room temperatures, a small amount of (unreacted $P_2O_5$) solid remaining in the flask was filtered off and the solvent was removed under vacuum. Infrared analysis showed a large band at 1288 cm.$^{-1}$ and a small shoulder at 1325 cm.$^{-1}$, indicating that the product still contained some pyrophosphate ester. Elemental analysis of the remaining, oily product, disclosed carbon, hydrogen, chlorine and phosphorus contents of 24.54, 3.79, 33.68 and 10.81 percent, respectively. This compares with theoretical values for the cyclic (chloromethyl)-ethylene phosphate, (chloromethyl)-ethylene ester of 25.77, 3.60, 25.36 and 14.76 percent, indicating that some polymerization of the epichlorohydrin took place along with the desired reaction with $P_2O_5$.

EXAMPLE 4

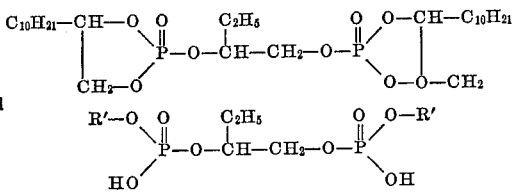

wherein R'=a mixture of $C_{10}H_{21}$—CH(OH)CH$_2$— and $C_{10}H_{21}$—CH(CH$_2$OH)— groups.

$P_2O_5$ (17.7 g., 0.125 mole) was added to 300 ml. toluene and the slurry cooled to 20° C., the equipment being essentially that of Example 1. 1,2-dodecene oxide (46.1 g., 0.25 mole) was added in small portions, with stirring, the reaction mixture being maintained between 5° and 21° C. At this point, infrared analysis disclosed absorption at 1320 cm.$^{-1}$, characteristic of bis-alkylene pyrophosphate. Several days later, 1,2-butylene oxide (8.99 g., 0.125 mole) was added to the stirred, brown pyrophosphate solution, it being noted that the addition of the oxide raised the temperature of the solution by 7 or 8° C. Infrared analysis made an hour after the addition of the butylene oxide showed some absorption at 1320 cm.$^{-1}$; however, on the following day it was found that this band had essentially disappeared. This material was then heated under vacuum to distill off the solvent, leaving 71.3 g. of a brown syrupy product identified as cyclic decylethylene phosphate, ethylethylene ester. It was slightly soluble in water and highly soluble in acetone and benzene. 40 g. of the product were then mixed with an excess of water. After a short period of immiscibility, the material became homogenous and had the appearance of a brown gelatin. At the end of one month the water was removed as the product was heated under vacuum to obtain 40.3 g. of a brown, oily product which had low to good solubility in acetone and benzene and good solubility in water. Elemental analysis was commensurate with that of a compound having the acyclic structural formula shown above. Said analysis disclosed carbon, hydrogen and phosphorus contents of 51.68, 9.58 and 10.01 percent, respectively, as against theoretical values of 50.50, 10.60 and 10.85 percent.

EXAMPLE 5

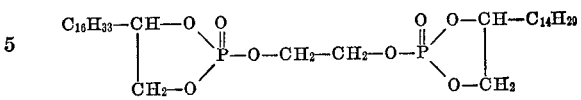

Following the general procedure of Example 1, $P_2O_5$ (45.9 g., 0.324 mole) in 900 ml. toluene was reacted with 164 g. (0.648 mole) of a mixture of 1,2-hexadecylene oxide (40%) and 1,2-octadecylene oxide (60%). At the end of the reaction period, conducted at 5–10° C. for approximately 1 hour, infrared analysis disclosed the presence of the cyclic pyrophosphate ester. Thereafter, ethylene oxide (15.9 g., 0.0324 mole) was dissolved in toluene and added to the reaction mixture in batches. Some heating was observed, and this portion of the reaction was also conducted at about 10° C. On being allowed to stand for several days, infrared analysis showed the product to have a strong peak at 1300 cm.$^{-1}$, with the pyrophosphate band at 1325 cm.$^{-1}$ observed earlier being completely gone.

With standing, the solution had lightened in color to a transparent, pale brown. The solvent was then removed by heating under vacuum. Infrared and elemental analysis indicate that the remaining, light brown oil is a mixed cyclic tetradecylethylene and hexadecylethylene phosphate, ethylene ester. The analysis showed the product to have carbon, hydrogen and phosphorus contents of 61.67, 10.29 and 9.03 percent, respectively, as against theoretical values of 62.22, 10.44 and 8.91 percent.

EXAMPLE 6

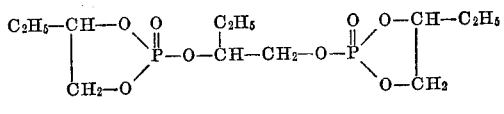

and

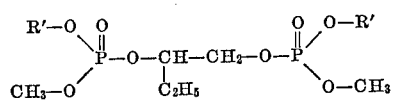

wherein R'=a mixture of $C_2H_5$CH(CH$_2$OH)— and $C_2H_5$CH(OH)CH$_2$—groups.

Using the same general procedure and with apparatus similar to that described in Example 2, $P_2O_5$ (112.6 g., 0.974 mole) was slurried in 1100 ml. chloroform containing approximately 11 ml. of $C_2H_5$OH as catalyst. 1,2-butylene oxide (171 g., 2.38 moles) was added slowly to the slurry. The resulting reaction was strongly exothermic and ice-cooling of the flask was used to maintain the temperature of the reaction mixture between 30° and 40° C. during this period of butylene oxide addition. After approximately ¾ of the oxide had been added, the strong exothermicity disappeared, although some heat was still generated as the final oxide portion was added. The resulting solution, now light brown in color, was allowed to stand for 2 days, after which it was heated at 50° C. for one hour to encourage completion of the insertion reaction. Infrared analysis disclosed the presence of strong absorption at 1288 cm.$^{-1}$, though there was evidence of some small absorption at 1320 cm.$^{-1}$ attributable to pyrophosphate. To the liquid reaction mixture, rich in cyclic ethylethylene phosphate, ethylethylene ester, was added 50.5 g. (1.58 moles) of methanol, after which the solution was heated at 60° C. for one hour. Excess methanol (200 ml.) was then added and the heating at 60° C. continued for another interval of about an hour. After three days of standing at room temperature, infrared analysis of the product disclosed no absorption at 1320 cm.$^{-1}$ or 1288 cm.$^{-1}$, and the presence of strong absorption at 1250 cm.$^{-1}$, characteristic of trialkyl phosphate. The solvent was then removed under high vacuum with gentle heating, thereby obtaining 323.6 g. of a light yellow oil as product. Infrared and elemental analysis indicated the compound to be one having the acyclic structural formula presented above. The compound was found to have carbon, hydrogen and phosphorus contents of 39.41, 7.33 and 14.55 percent, respectively, as against theoretical values of 39.81, 7.64 and 14.67 percent. It is moderately soluble in water and highly soluble in benzene and acetone.

EXAMPLE 7

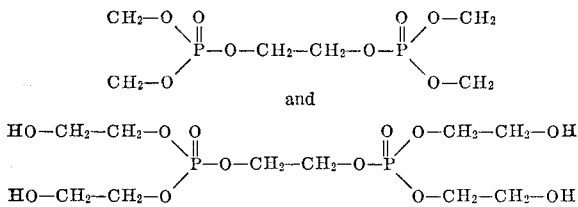

and

In the same general fashion and with apparatus similar to that described in Example 2, ethylene oxide (165 g., 3.75 moles) dissolved in 500 ml. chloroform is slowly added to a stirred slurry of P$_2$O$_5$ (177 g., 1.25 moles) in 500 ml. chloroform. All the chloroform employed contained one percent of ethanol which acted here as a catalyst. The exothermic reaction was controlled at 30° C. by ice cooling. At the end of the ethylene oxide addition period, the mixture was allowed to cool and stand overnight. To the resulting solution of cyclic ethylene phosphate, ethylene ester was added ethylene glycol (310 g., 5 moles) in one batch to effect glycolysis of the cyclic ester. The resulting system was at first all in one phase. After about ½ hour, the flask became warm and a second layer had formed. The solvent was then removed by stripping the two-layer system under vacuum. It was noted that after 200–300 ml. of the chloroform had been removed, the flask was cold and the system had returned to a single phase. The stripping was then completed using a boiling water bath and a pressure of 0.15 mm. Hg for 4 hours, the ethylene glycol coming over at 55° C. There was obtained 455.1 g. of a thick syrup having the appearance of a colorless liquid. This material was found to be slightly soluble in benzene, moderately soluble in acetone, and highly soluble in ethanol and water. Elemental and infrared analysis were consistent with that of a product having the acyclic structural formula given above. It was found to have carbon, hydrogen and phosphorus contents of 28.9, 4.9 and 16.7 percent, respectively, as compared to theoretical values for di(β-hydroxyethyl)phosphate, ethylene ester, of 30.16, 6.07 and 15.55 percent.

EXAMPLE 8

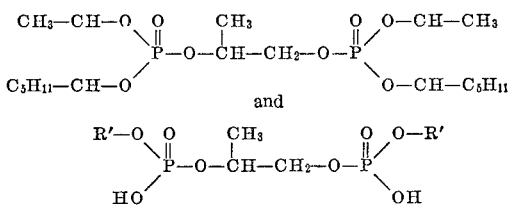

and

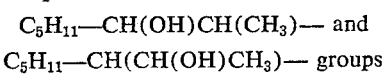

wherein R' represents a mixture of

C$_5$H$_{11}$—CH(OH)CH(CH$_3$)— and

C$_5$H$_{11}$—CH(CH(OH)CH$_3$)— groups

The general procedure of Example 1, using P$_2$O$_5$ and 2,3-octylene oxide, was repeated except that 1,2-propylene oxide was substituted for the 1,2-butylene oxide as the R$^2$O reactant. The reaction mixture was heated between 40° and 55° C. for 2 hours after the propylene oxide had been added. After being allowed to stand at room temperatures for several days, infrared analysis disclosed the product to still contain a slight amount of pyrophosphate. The latter was converted to cyclic 1-methyl-2-pentylethylene phosphate, methylethylene ester by boiling the reaction mixture for ½ hour. Water was then added to the reaction mixture in 300 percent excess and the solution then stirred and heated for one hour at 50°–60° C. Two layers were present. The solvent and water were then stripped off as the solution was heated under vacuum. The resulting hydroxyoctyl acid phosphate, methylethylene ester was obtained in substantially 100 percent yield. It was found to have carbon, hydrogen and phosphorus contents of 42.53, 9.59 and 12.12 percent, respectively as against theoretical values of 45.67, 8.70 and 12.73. It is an amber oil having low to good solubility in benzene and good solubility in acetone and water.

EXAMPLE 9

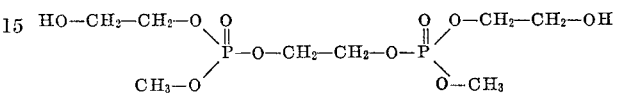

Approximately 40 g. of cyclic ethylene phosphate, ethylene ester, prepared in a manner generally similar to that of Example 7, was mixed with excess methanol and allowed to stand for 12 hours. The reaction mixture was then heated under vacuum to distill off the excess methanol. There remained 39.7 g. of an oily liquid which, on being subjected to infrared analysis, showed absorption at 1250–1255 cm.$^{-1}$, characteristic of trialkyl phosphates. Elemental analysis disclosed the product to have carbon, hydrogen and phosphorus contents of 28.99, 5.91 and 17.79 percent, respectively, as against theoretical values, for the above ocmpound, of 28.41, 5.96 and 18.32 percent.

EXAMPLE 10

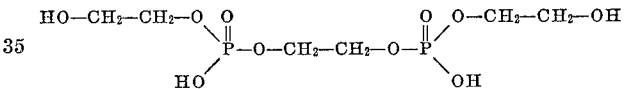

Example 9 was repeated, but with the cyclic ester being poured into water and shaken. Heat developed immediately and the organic material went into solution. Elemental analysis disclosed carbon, hydrogen and phosphorus contents of 23.3, 5.1 and 19.8 percent, respectively, as against theoretical values for the acid ester product shown of 23.23, 5.29 and 19.97 percent.

EXAMPLE 11

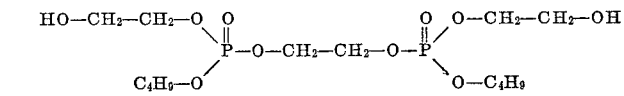

A 3 mole portion of the crude reaction mixture of the type obtained in Example 7 (wherein the cyclic ethylene phosphate, ethylene ester is present in chloroform solution) was added to one liter of warm n-butanol. The product was allowed to stand for a period of an hour or so, following which it was heated under vacuum to distill off residual chloroform and butanol. There were recovered 1130 g. of the above product which analysis disclosed to have carbon, hydrogen and phosphorus contents of 39.69, 7.43 and 14.82 percent, respectively, as against theoretical values for the above compound of 39.81, 7.64 and 14.67 percent.

EXAMPLE 12

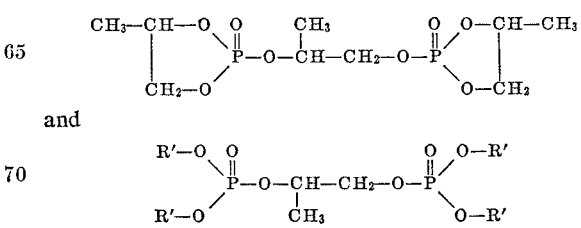

wherein the R's represent CH$_2$(OH)CH(CH$_3$)— or HOCH(CH$_3$)—CH$_2$— groups.

Using the same general method of Example 2 and with apparatus scaled up from that employed therein, $P_2O_5$ (568 g., 4 moles) was added to 5.5 l. chloroform along with 2.2 g. of terephthalic acid as catalyst. The resulting slurry was heated to reflux, and the heat turned off. 1,2-propylene oxide (814 g., 14 moles) was then added portionwise through an addition funnel at a rate which kept the reaction mixture at reflux, the total addition time being about 45 minutes. Following the addition of the propylene oxide the solution was refluxed for an additional time of about 2 hours. During this final reflux period, infrared analyses were made from time to time to determine whether absorption at 1320 cm.$^{-1}$ was still present, and with each finding of the presence of the band, an additional 2 moles of propylene oxide was added. At the conclusion of the heating, no absorption at 1320 cm.$^{-1}$ occurred.

To the above solution of cyclic methylethylene phosphate, methylethylene ester was added propylene glycol (608 g., 8 moles) and triethylamine catalyst (37.5 g. or 2% by weight). The resulting material was then mixed thoroughly and allowed to stand at room temperature for 5 days. Infrared analysis then disclosed that the glycolysis reaction was complete, there being no absorption in the region of 1290 cm.$^{-1}$. The crude product was stripped of solvent and other low boiling components by heating under vacuum. The remaining product, a light yellow oil with good solubility in water, was found to conform to the acyclic structure presented above, it having carbon, hydrogen and phosphorus contents of 37.81, 6.11 and 13.35 percent, respectively, as against theoretical values of 38.5, 7.3 and 13.2 percent.

EXAMPLE 13

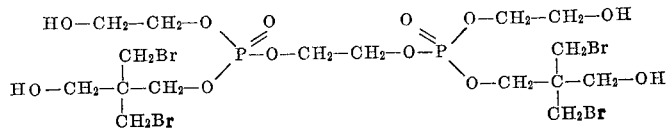

To a solution in chloroform of the cyclic ethylene phosphate, ethylene ester as prepared in Example 7 (3.87 g., 0.014 mole), was added 2,2-bis(bromomethyl)propanediol-1,3 (7.34 g., 0.028 mole). The reactants were charged to a 50 ml., round bottom flask and heated on a steam bath at 60° C. using a condenser and a drying tube. A uniform solution was obtained in about 10 minutes. The solution was allowed to stand for several days, with intermittent heating on the steam bath and sampling for infrared analysis. When the reaction was judged to be complete, the solvent was stripped off under vacuum, leaving a tan viscous syrup having low to moderate solubility in water and good solubility in acetone and chloroform. Elemental analysis disclosed the presence of carbon, hydrogen, phosphorus and bromine in the amounts of 23.9, 3.8, 7.6 and 40.1 percent, respectively, as against theoretical values, for the compound presented above, of 24.0, 4.0, 7.8 and 40.1 percent.

I claim:

1. A process for preparing a cyclic alkylene phosphate alkylene ester of the formula

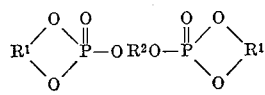

which comprises reacting by contacting at about 20–125° C. a bis-alkylene pyrophosphate of the formula

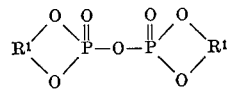

with an alkylene oxide of the formula $R^2O$, where, in all the above formulas, $R^1$ and $R^2$ are vicinal alkylene groups of 2 to 20 carbon atoms.

2. A process in accordance with claim 1 wherein the reaction is conducted at temperatures in a range of from about 40° C. up to the reflux temperature of the reaction mixture.

3. A process in accordance with claim 1 wherein the reaction is conducted in the presence of ethanol or an acid material, as catalyst.

4. A process for preparing cyclic alkylene phosphate, alkylene esters as in claim 1, which comprises the steps of reacting $P_2O_5$ with a first alkylene oxide $R^1O$ in a ratio of 1 mole of $P_2O_5$ to approximately 2 moles of said alkylene oxide, said reaction being conducted at temperatures of from about 0° C. to 100° C. and in the presence of an inert, anhydrous liquid reaction medium to form a bis-alkylene pyrophosphate, and then adding to the reaction mixture an amount of a second alkylene oxide $R^2O$ which is equal to at least about 1 mole per mole of $P_2O_5$ employed, said second alkylene oxide being the same as or different from the first alkylene oxide, and continuing the reaction at temperatures of from about 20° C. to 125° C. to form said cyclic alkylene phosphate, alkylene ester.

5. A process in accordance with claim 4 wherein the final reaction step is continued until the product, on infrared analysis, becomes substantially free of absorption in the region of 1320–1325 cm.$^{-1}$.

6. A process in accordance with claim 4 wherein the reaction is also conducted in the presence of ethanol or of an acid material, as catalyst.

References Cited

UNITED STATES PATENTS

| | | | |
|---|---|---|---|
| 2,841,608 | 7/1958 | Hechenbleikner et al. | 260—927 |
| 2,952,701 | 9/1960 | McConnell et al. | 260—927 |
| 2,974,158 | 3/1961 | Lanham | 260—927 |
| 3,153,036 | 10/1964 | Merten et al. | 260—927 X |
| 3,450,803 | 6/1969 | Odinak et al. | 260—980 X |

CHARLES B. PARKER, Primary Examiner

R. L. RAYMOND, Assistant Examiner

U.S. Cl. X.R.

260—77.5 AR, 927 R, 928, 980, 982, 988